(12) United States Patent
Ayoub

(10) Patent No.: US 11,130,436 B2
(45) Date of Patent: Sep. 28, 2021

(54) VEHICLE HAULING APPARATUS

(71) Applicant: DMA, Corp., Foxboro, MA (US)

(72) Inventor: Maroun Youssef Ayoub, Foxboro, MA (US)

(73) Assignee: DMA, Corp., Foxboro, MA (US)

( * ) Notice: Subject to any disclaimer, the term of this patent is extended or adjusted under 35 U.S.C. 154(b) by 345 days.

(21) Appl. No.: 16/231,579

(22) Filed: Dec. 23, 2018

(65) Prior Publication Data

US 2019/0193621 A1 Jun. 27, 2019

Related U.S. Application Data

(60) Provisional application No. 62/610,195, filed on Dec. 23, 2017.

(51) Int. Cl.
| | |
|---|---|
| *B60P 3/077* | (2006.01) |
| *B60R 9/06* | (2006.01) |
| *B60R 9/10* | (2006.01) |
| *B60D 1/46* | (2006.01) |

(52) U.S. Cl.
CPC .............. *B60P 3/077* (2013.01); *B60D 1/465* (2013.01); *B60R 9/06* (2013.01); *B60R 9/10* (2013.01)

(58) Field of Classification Search
CPC .... B60P 3/06; B60P 3/07; B60P 3/073; B60P 3/075; B60P 3/077; B60R 9/06; B60R 9/10; B60D 1/42; B60D 1/46; B60D 1/465; B62H 3/08
See application file for complete search history.

(56) References Cited

U.S. PATENT DOCUMENTS

| | | | | |
|---|---|---|---|---|
| 3,018,117 A | * | 1/1962 | Bechard ................. | B60D 1/465 280/490.1 |
| 3,236,541 A | * | 2/1966 | Poteet ...................... | B60D 1/46 280/490.1 |
| 4,103,928 A | * | 8/1978 | Sheppard, Jr. ........... | B60D 1/46 280/490.1 |
| 4,111,449 A | * | 9/1978 | Hancock ................. | B60P 3/125 280/292 |
| 4,148,498 A | * | 4/1979 | Taylor, Jr. .............. | B60G 11/36 280/124.165 |
| 5,431,522 A | * | 7/1995 | Ross ........................ | B60R 9/06 224/497 |
| 5,482,424 A | * | 1/1996 | Jones ................... | A61G 3/0209 224/510 |

(Continued)

*Primary Examiner* — Minnah L Seoh
*Assistant Examiner* — Maurice L Williams
(74) *Attorney, Agent, or Firm* — Gary S. Engelson

(57) ABSTRACT

A vehicle hauling apparatus for hauling a second vehicle with a first vehicle includes: a hitch bar for attaching the apparatus to a hitch receiver; a first rail mounted and arranged vertically to the hitch bar; a second rail mounted and arranged to slide vertically along the first rail; a jacking mechanism connecting the first rail to the second rail so as to lift and lower the second rail; a first element of a pivot attached to the second rail; a wheel cradle in which a tire of the second vehicle may be seated; and a second element of the pivot attached to the wheel cradle; whereby the tire of the second vehicle may be rolled along a ground surface into the wheel cradle while the wheel cradle rests on the ground surface and then be raised into a position for hauling by the jacking mechanism.

2 Claims, 5 Drawing Sheets

(56) References Cited

U.S. PATENT DOCUMENTS

| | | | | |
|---|---|---|---|---|
| 5,697,629 A * | 12/1997 | Guild | B60R 9/06 | 280/402 |
| 5,975,553 A * | 11/1999 | Van Vleet | B60D 1/46 | 280/483 |
| 5,984,613 A * | 11/1999 | Motilewa | B60R 9/06 | 224/519 |
| 6,003,892 A * | 12/1999 | Henson | B60D 1/465 | 254/420 |
| 6,244,813 B1 * | 6/2001 | Cataldo | B60P 3/125 | 224/521 |
| 6,312,210 B1 * | 11/2001 | Lang | B60R 9/06 | 224/570 |
| 6,352,401 B1 * | 3/2002 | LeMay | B60P 3/125 | 280/402 |
| 6,524,054 B2 * | 2/2003 | Maney | B60P 1/4421 | 224/519 |
| 6,585,280 B1 * | 7/2003 | Wiers | B60D 1/18 | 280/468 |
| 6,595,398 B2 * | 7/2003 | Himel, Jr. | B60R 9/06 | 224/495 |
| 6,612,615 B1 * | 9/2003 | Dimand | B60R 9/06 | 224/531 |
| 6,663,133 B1 * | 12/2003 | Rosenlund | B60D 1/06 | 280/490.1 |
| 6,682,292 B2 * | 1/2004 | Estes | B60D 1/58 | 280/402 |
| 6,824,156 B2 * | 11/2004 | Smith | B60D 1/52 | 280/490.1 |
| 7,101,142 B2 * | 9/2006 | Bik | B60R 9/065 | 224/519 |
| 7,188,856 B2 * | 3/2007 | Maynard | B60P 3/077 | 280/402 |
| 7,380,803 B2 * | 6/2008 | Thomas | B60R 9/06 | 224/519 |
| 7,407,151 B2 * | 8/2008 | Rabska | B60P 3/1066 | 254/325 |
| 7,537,234 B2 * | 5/2009 | McClellan | B60P 3/077 | 280/402 |
| 7,704,034 B1 * | 4/2010 | Quigley, III | B60P 3/125 | 414/462 |
| 7,798,760 B2 * | 9/2010 | Strassman | B60P 3/077 | 414/462 |
| 8,016,313 B2 * | 9/2011 | Gilels | B60D 1/145 | 280/402 |
| 8,585,072 B2 * | 11/2013 | Momaly | B60P 3/125 | 280/402 |
| 8,602,437 B1 * | 12/2013 | Morris | B60R 9/06 | 280/402 |
| 8,911,195 B2 * | 12/2014 | Derrick | B60P 3/122 | 414/462 |
| 9,096,160 B2 * | 8/2015 | Le Anna | B60R 9/06 | |
| 9,216,698 B2 * | 12/2015 | Rhodes | B60R 9/065 | |
| 9,217,535 B1 * | 12/2015 | Egan | F16M 13/022 | |
| 9,233,634 B1 * | 1/2016 | Level | B60P 3/125 | |
| 10,232,792 B2 * | 3/2019 | Egan | A61G 3/062 | |
| 2006/0027998 A1 * | 2/2006 | Lewis | B60D 1/465 | 280/511 |
| 2007/0092366 A1 * | 4/2007 | Bose | B66F 9/082 | 414/607 |
| 2008/0044269 A1 * | 2/2008 | Pradenas | B60P 3/122 | 414/462 |
| 2008/0100076 A1 * | 5/2008 | Potts | B60R 9/06 | 296/3 |
| 2009/0028679 A1 * | 1/2009 | Smith | B60R 9/06 | 414/462 |
| 2011/0049207 A1 * | 3/2011 | Hufgard | B60P 3/07 | 224/510 |
| 2015/0274087 A1 * | 10/2015 | Yorke Roe | B60R 9/06 | 414/462 |
| 2017/0320447 A1 * | 11/2017 | Dunlap | B60P 1/02 | |
| 2021/0101427 A1 * | 4/2021 | Ayoub | B60D 1/187 | |

* cited by examiner

VEHICLE HAULING APPARATUS

BACKGROUND OF THE INVENTION

The present invention relates to devices for hauling or trailering motorcycles or similar vehicles behind a car, truck, motorhome, or the like equipped with a conventional hitch receiver.

SUMMARY OF THE INVENTION

According to one embodiment, a vehicle hauling apparatus includes: a hitch bar for attaching the apparatus to a hitch receiver; a first rail mounted and arranged vertically to the hitch bar; a second rail mounted and arranged to slide vertically along the first rail; a jacking mechanism connecting the first rail to the second rail so as to lift and lower the second rail; a first element of a pivot attached to the second rail; a wheel cradle in which a vehicle tire may be seated; and a second element of the pivot attached to the wheel cradle; whereby the vehicle tire may be rolled along a ground surface into the wheel cradle while the wheel cradle rests on the ground surface and then raised into a position for hauling by the jacking mechanism. According to one variation, the jacking mechanism is a leadscrew having a head and a threaded shaft and a follower nut threaded onto the threaded shaft. Other variations of the jacking mechanism include a hand or machine-driven winch and strap or cable or a hydraulic jack to rais and lower the second rail. According to another variation, the pivot is a pair of pintle and gudgeon hinges; whereby the wheel cradle may be detached from the second rail. In a further variation of the jacking mechanism, a horizontal flange in an upper portion of the first rail includes a bearing surface defining a hole receiving the threaded shaft of the leadscrew and supporting the head of the leadscrew; and a retaining pin extends through holes in the first rail and vertical slots in the second rail; whereby when either the towed or towing vehicle encounter a roadway imperfection, the second rail may move through a range of movement to prevent damage to the tow vehicle and motorcycle, combined.

In the following description reference is made to the accompanying drawings, which form a part hereof, and in which are shown example implementations. It should be understood that other implementations are possible, and that these example implementations are intended to be merely illustrative.

DETAILED DESCRIPTION

Figure 1:
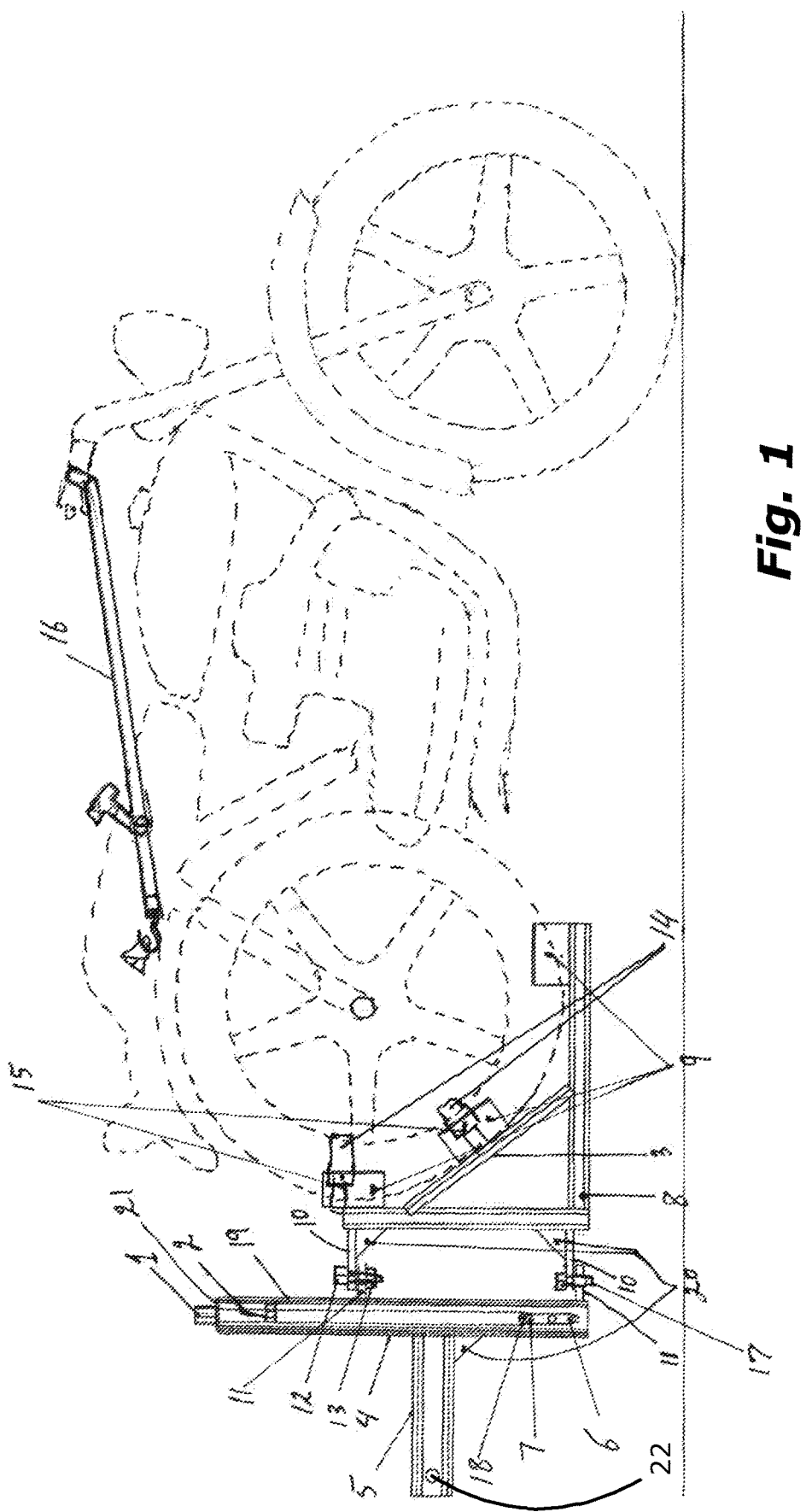
FIG. 1 is a side view with partial cutaways illustrating the main components of an exemplary embodiment of the invention.

The following section describes in detail an exemplary embodiment of the invention illustrating by example its principles of construction and usage.

Referring to the drawings, the elements of the exemplary embodiment, their relationships to each other, and several alternatives are now described.

As shown in FIG. 1, the motorcycle hauling apparatus of this embodiment is designed for attachment to a conventional hitch receiver. A hitch bar 5 is provided to connect the apparatus to the hitch receiver (not shown) of a tow vehicle. The hitch bar 5 may be made in any standard size and should have a hole 22 through which to receive a retention pin, as is conventional. The hitch bar 5 supports a first rail, fixed rail 4, that in turn supports a second rail, lift rail 19, through a lift mechanism including a leadscrew 1 and a follower nut 2.

Reference is now made to FIG. 1, along with FIGS. 2, 3, 4 and 5, showing the rails, leadscrew, and follower nut in more detail. The leadscrew 1 is supported by leadscrew head at the top of fixed rail 4 by a top plate 21 having a clearance hole for receiving the leadscrew 1 shaft, but small enough such that the top plate 21 provides a bearing surface against which the head of the leadscrew 1 bears. The follower nut 2 is securely fixed to an interior surface of the lift rail 19, for example by being welded in place, or by being captured within flanges welded to the interior surface of lift rail 19 for retaining the follower nut 2, such that operating the leadscrew 1 will raise and lower the follower nut 2 and consequently raise and lower the lift rail 19 to which it is affixed. The combined system of hitch bar 5, fixed rail 4, lift rail 19, and top plate 21 is made of a material and has a cross-section sufficient to support the weight carried through the foregoing elements. The leadscrew 1 and follower nut 2 should be able to lift and lower the lift rail 19 by 11" or such other distance as to permit the system to raise a wheel cradle 8 (described below) from ground level to a safe level from which to tow a motorcycle or other vehicle secured thereto (also, as described below). Other embodiments may move the lift rail 19 by a greater or lesser distance. Also, in other embodiments a winch and cable or strap or a hydraulic jack could be used in place of leadscrew 1 and nut 2.

Figure 2:
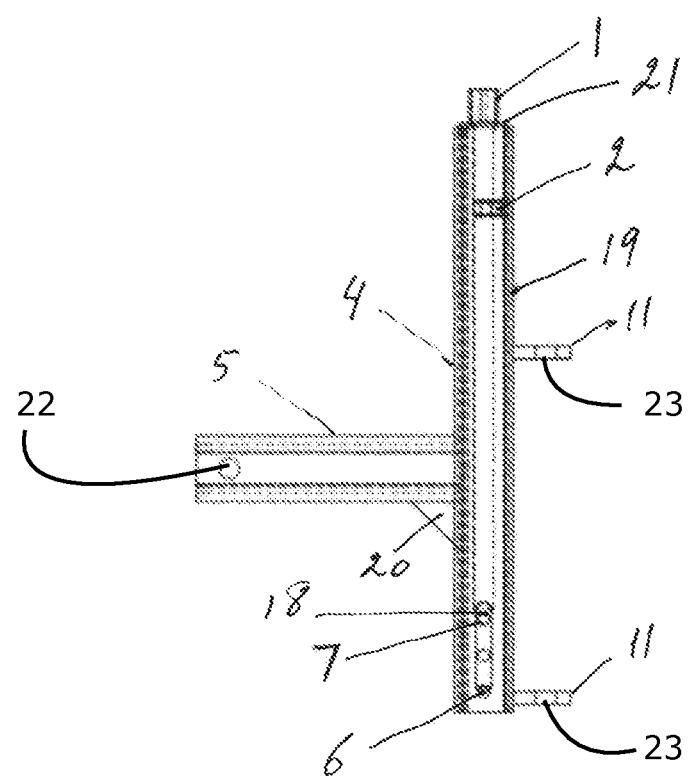
FIG. 2 is a side view with partial cutaways illustrating the hitch, fixed rail, and lift rail mechanisms of the embodiment.
Figure 3:
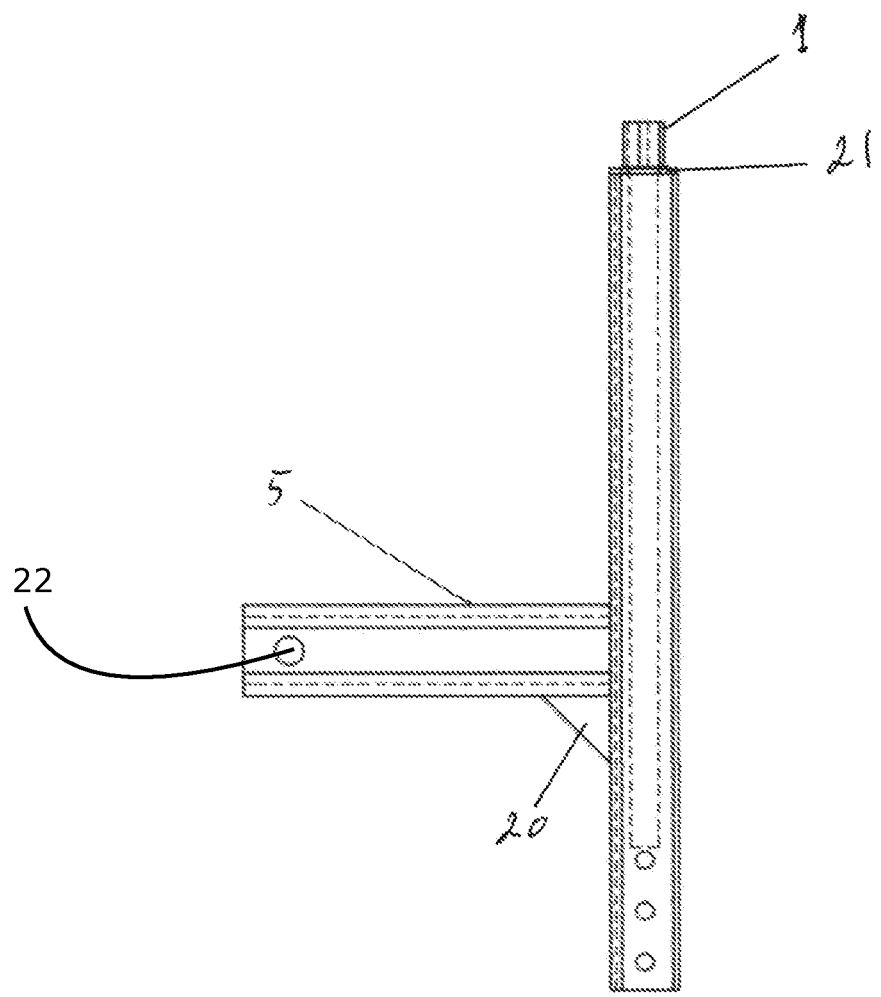
FIG. 3 is a side view with partial cutaways illustrating the hitch and fixed rail mechanism, including the lead screw.
Figures 4, 5:
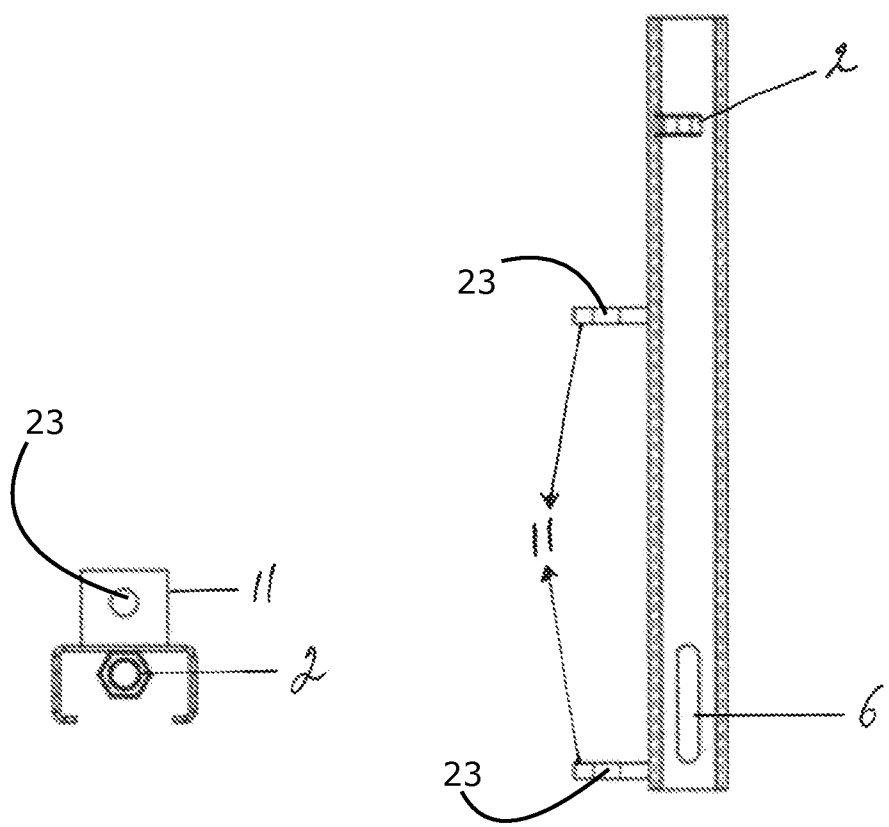
FIG. 4 is a side view with partial cutaways illustrating the lift rail and follower nut mechanisms of the embodiment.
FIG. 5 is a top view of the lift rail and follower nut mechanisms of the embodiment.

For safety purposes, referring to FIGS. 2, 3, and 4, when the lift rail 19 is in the raised position, the fixed rail 4 and the lift rail 19 can be pinned together by inserting into impact accommodation slot 6 a hardened steel bolt 7 secured by a locknut 18, or alternatively by inserting into impact accommodation slot 6 a clevis pin secured by an E-clip, spring pin, or the like. The leadscrew 1 is not supported from below against forces that would raise the head of leadscrew 1 above the bearing surface of the top plate 21. The impact accommodation slot 6 thus accommodates a travel distance suitable to absorb minor contacts between the lower portions of the apparatus and the ground while under way, but not excessive movement that would damage the hauled or hauling vehicle or the apparatus. An impact accommodation slot 6 having a length of about 2½" is suitable. In some embodiments, a somewhat longer or shorter slot may be used. While simple holes would provide one desired safety function of preventing the lift rail 19 from completely dropping away from the fixed rail 4 in the event of a failure of the leadscrew 1 or related components, such an arrangement would not provide relief in the event of ground contact by the apparatus while under way.

Figure 6:
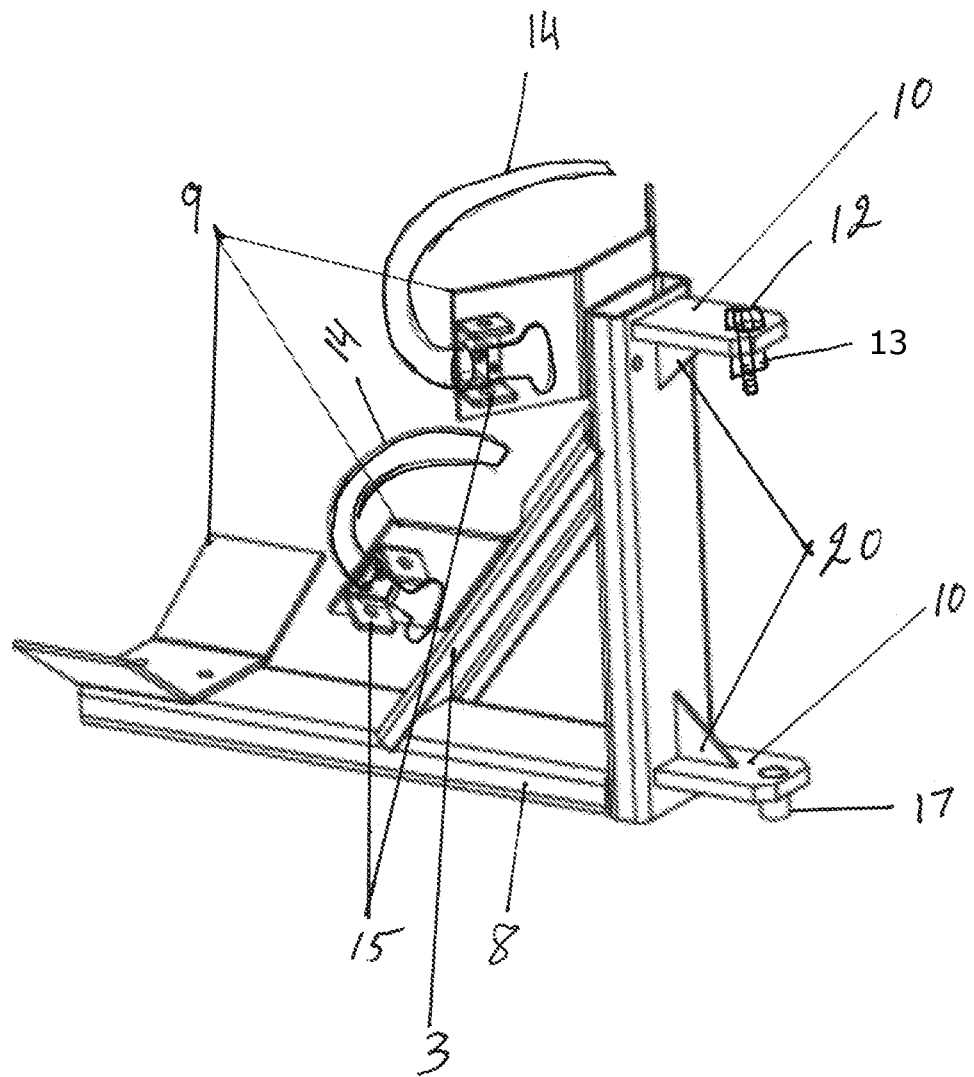
FIG. 6 is a perspective view of the wheel cradle and associated components of the embodiment.

Attachment and construction of the wheel cradle 8 and related components to the rail system described above is now described with reference to FIGS. 1 and 6. Using a pair of pintle and gudgeon hinges comprised of several components (10, 11, 12, 13, and 17, described in greater detail below), the lift rail 19 supports a wheel cradle 8 for receiving a front or rear wheel of a motorcycle or other vehicle to be hauled. While this example is given in the context of hauling a motorcycle, other vehicles can be hauled by similar apparatus. If the vehicle to be hauled has one wheel at the end to be lifted off the ground, then the apparatus may include one wheel cradle 8. If the vehicle to be hauled has two wheels at the end to be lifted off the ground, or two motorcycles are to be hauled side-by-side, then the apparatus may include two wheel cradles 8. In such an embodiment, two separate systems each including a fixed rail 4 and lift rail 19, together with the associated components described above, may be connected to the hitch bar 5. Alternatively, a single fixed rail 4 and lift rail 19 could support two sets of gudgeon hinge pairs separated horizontally by a cross-bar or the like to allow attachment of two wheel cradles 8 separated as the gudgeon hinge sets are.

To ensure a good fit with various wheel sizes, the wheel cradle 8 may come in a variety of widths and/or depths accommodating the various wheel sizes. Alternatively, the wheel cradle 8 may receive wheel support brackets 9 fitted to the various wheel sizes, and adapted to securely mount within the wheel cradle 8.

The wheel cradle 8 and wheel support brackets 9 may be constructed of sheet metal or other materials of suitable strength and weight, cast aluminum or other metal or material of suitable strength, box beams, L-beams, or other structural configurations from which the wheel cradle shape 8 can be formed and which have sufficient strength and low enough weight to perform the task.

The lift rail 19 is first lowered to bring the wheel cradle 8 to the ground, in order to load the wheel into the wheel cradle 8. The vehicle is moved to roll the wheel along the ground, directly into the wheel cradle 8. The wheel is secured into the wheel cradle 8 by a strap 14 and tensioner 15 system connected to one or more wheel support brackets or other suitable attachment points that can exert sufficient force to substantially prevent movement of the wheel within the wheel cradle 8 once cinched down. Alternatively, a clamp system of metal or other suitable material or a pin secured through holes in the wheel support brackets and passing through the wheel could be used to positively secure the wheel. Then the wheel cradle 8 can be raised to the hauling position by operating the leadscrew 1 until the hauling position is reached. At that point, the bolt 7 should be inserted and secured by lock nut 18. Alternatively, as previously mentioned, a clevis pin could be inserted and secured by an E-clip, spring pin or the like. The tension on the leadscrew 1 can then be released.

In another embodiment, the wheel cradle 8 could include a folding or auxiliary ramp structure so that the wheel cradle 8 need not be lowered completely to the ground for loading.

The construction of the pintle and gudgeon hinges (10, 11, 12, 13, and 17) is now described in greater detail. The pintle and gudgeon hinges serve two purposes. They allow the hauled vehicle to track turns, curves, and other maneuvers by the hauling vehicle, and they allow the wheel cradle 8 and related components to be removed from the apparatus for easier carriage when not hauling a vehicle.

The top hinge includes a pintle 10, 20, 12, and 13; the bottom hinge includes a pintle 10, 20, and 17. Each pintle is supported by a mounting plate 10 and a gusset 20 or other suitable structure to support the weight of the wheel cradle 8 and tow. The pin of the top hinge is a long bolt 12, whose threaded end accommodates locking nut 13 that is threaded onto bolt 12 after assembly to corresponding gudgeons as described below. When assembled, the locking nut 13 is turned onto the end of the long bolt 12 to prevent the hinge from separating under vertical loading from below, such as when going over a bump. The locking nut 13 is not made tight, so the hinge does not bind, but locking nut 13 is of a type that will not back off on its own. The bottom hinge simply includes a short pin 17.

The pins 12 and 17 of the pintles are each inserted into a hole 23 in a gudgeon 11. Each gudgeon 11 is substantially a reinforced plate with a hole 23 to accommodate the corresponding pintle pin 12 and 17.

When the apparatus is configured for hauling a motorcycle or similar vehicle by its rear wheel, handlebar straps 16 or other bracing, such as adjustable bars, should be employed to control and hold substantially constant the angle between the front wheel and the orientation of the vehicle being hauled.

What is claimed is:

1. A vehicle hauling apparatus for hauling a second vehicle with a first vehicle, comprising:
   a hitch bar for attaching the apparatus to a hitch receiver of the first vehicle;
   a first rail mounted and arranged vertically to the hitch bar;
   a second rail mounted and arranged to slide vertically along the first rail;
   a jacking mechanism connecting the first rail to the second rail by a leadscrew having a head and a threaded shaft and a follower nut threaded onto the threaded shaft so as to lift and lower the second rail;
   a first element of a pivot attached to the second rail;
   a wheel cradle in which a tire of the second vehicle may be seated; and
   a second element of the pivot attached to the wheel cradle; whereby
   the tire of the second vehicle may be rolled along a ground surface into the wheel cradle while the wheel cradle rests on the ground surface and then be raised into a position for hauling by the jacking mechanism;
   a horizontal flange in an upper portion of the first rail including a bearing surface defining a hole receiving the threaded shaft of the leadscrew and supporting the head of the leadscrew;
   a support fixing the follower nut to the second rail; and
   a clevis pin extending through holes in the first rail and vertical slots in the second rail; whereby
   when either one or both of the first and second vehicles encounter a roadway imperfection, the second rail may move through a range of movement to prevent damage to either one or both of the first and second vehicles.

2. The vehicle hauling apparatus of claim 1, wherein the pivot comprises:
   a pair of pintle and gudgeon hinges; whereby
   the wheel cradle may be detached from the second rail.

\* \* \* \* \*